United States Patent
Berrange et al.

(10) Patent No.: US 8,959,510 B2
(45) Date of Patent: Feb. 17, 2015

(54) PROVIDING A TRUSTED ENVIRONMENT FOR PROVISIONING A VIRTUAL MACHINE

(75) Inventors: Daniel P. Berrange, London (GB); Dmitri Pal, Framingham, MA (US); Simo S. Sorce, New York, NY (US)

(73) Assignee: Red Hat, Inc., Raleigh, NC (US)

( * ) Notice: Subject to any disclaimer, the term of this patent is extended or adjusted under 35 U.S.C. 154(b) by 1476 days.

(21) Appl. No.: 12/407,211

(22) Filed: Mar. 19, 2009

(65) Prior Publication Data

US 2010/0242038 A1 Sep. 23, 2010

(51) Int. Cl.
- G06F 9/44 (2006.01)
- G06F 21/33 (2013.01)
- H04L 29/06 (2006.01)
- G06F 21/44 (2013.01)
- G06F 9/455 (2006.01)

(52) U.S. Cl.
CPC .......... *H04L 63/0838* (2013.01); *G06F 21/445* (2013.01); *G06F 9/45558* (2013.01); *G06F 2009/45587* (2013.01)
USPC ................................. 718/1; 726/10

(58) Field of Classification Search
None
See application file for complete search history.

(56) References Cited

U.S. PATENT DOCUMENTS

| | | | |
|---|---|---|---|
| 7,577,722 B1 * | 8/2009 | Khandekar et al. | 709/220 |
| 2006/0259759 A1 * | 11/2006 | Maino et al. | 713/151 |
| 2007/0174429 A1 * | 7/2007 | Mazzaferri et al. | 709/218 |
| 2007/0250833 A1 * | 10/2007 | Araujo et al. | 718/1 |
| 2007/0300220 A1 * | 12/2007 | Seliger et al. | 718/1 |
| 2008/0134175 A1 * | 6/2008 | Fitzgerald et al. | 718/1 |
| 2008/0201414 A1 * | 8/2008 | Amir Husain et al. | 709/203 |
| 2008/0301770 A1 * | 12/2008 | Kinder | 726/2 |
| 2009/0060187 A1 * | 3/2009 | Doyle et al. | 380/259 |
| 2009/0094673 A1 * | 4/2009 | Seguin et al. | 726/1 |
| 2010/0023996 A1 * | 1/2010 | Sabin et al. | 726/1 |
| 2011/0214176 A1 * | 9/2011 | Burch et al. | 726/15 |
| 2011/0246778 A1 * | 10/2011 | Duane | 713/176 |

OTHER PUBLICATIONS

MIT (Kerberos V5 System Administrator's Guide) Release: 1.2; Document Edition: 1.0; Jun. 16, 2000; 36 pages.*

* cited by examiner

*Primary Examiner* — Keith Vicary
(74) *Attorney, Agent, or Firm* — Lowenstein Sandler LLP

(57) ABSTRACT

In one embodiment, a mechanism for providing a trusted environment for provisioning a virtual machine is disclosed. In one embodiment, a method includes beginning an initialization process of a virtual machine (VM) hosted by a VM host server, obtaining by the VM as part of the initialization process a one-time password from the VM host server, the one-time password provided to the VM host server from a management server that created the one-time password, and authenticating the VM with an identity server using the one-time password.

20 Claims, 5 Drawing Sheets

PROVIDING A TRUSTED ENVIRONMENT FOR PROVISIONING A VIRTUAL MACHINE

TECHNICAL FIELD

The embodiments of the invention relate generally to virtual machine systems and, more specifically, relate to providing a trusted environment for provisioning a virtual machine.

BACKGROUND

In computer science, a virtual machine (VM) is a software implementation of a machine (computer) that executes programs like a real machine. A virtual machine monitor (VMM) is a portion of software that, when executed on appropriate hardware, creates an environment allowing the virtualization of an actual physical computer system. Each VM may function as a self-contained platform, running its own operating system (OS) and software applications (processes). Typically, the VMM manages allocation and virtualization of computer resources and performs context switching, as may be necessary, to cycle between various VMs.

A host machine (e.g., computer or server) is typically enabled to simultaneously run multiple VMs, where each VM may be used by a remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices, making the use of the VM transparent to the guest operating system or the remote client that uses the VM.

Recently, solutions providing centralized hosting for VMs that run (virtual) desktops have been developed. Such solutions consist of centralized servers that are partitioned into multiple VMs that host the virtual desktops, thereby providing a desktop for each user. The centralized hosting provides the manageability of server-based computing, while the dedicated environment provides the flexibility and compatibility with applications that a desktop enables. In general, VMs therefore enable remote access to a host or server computer by a remote client computer, which mimics or reconstructs the events taking place on the host computer.

However, one of the challenges that arises with such centralized hosting of VMs is security of the VM provisioning process. There are many components involved in the initial provisioning of a VM in a VM system, such as an identity server, a management server, a host server, and the VM operating system (OS) itself. As a result, many opportunities for security breaches present themselves with the different communication channels utilized between the components when provisioning a VM. Presently, initial provisioning of VM requires the use of a hard-coded password over an insecure channel or the manual intervention of an administrator. These solutions are insecure, inefficient, and time-consuming. As such, a solution for provisioning a trusted environment for provisioning a new VM would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
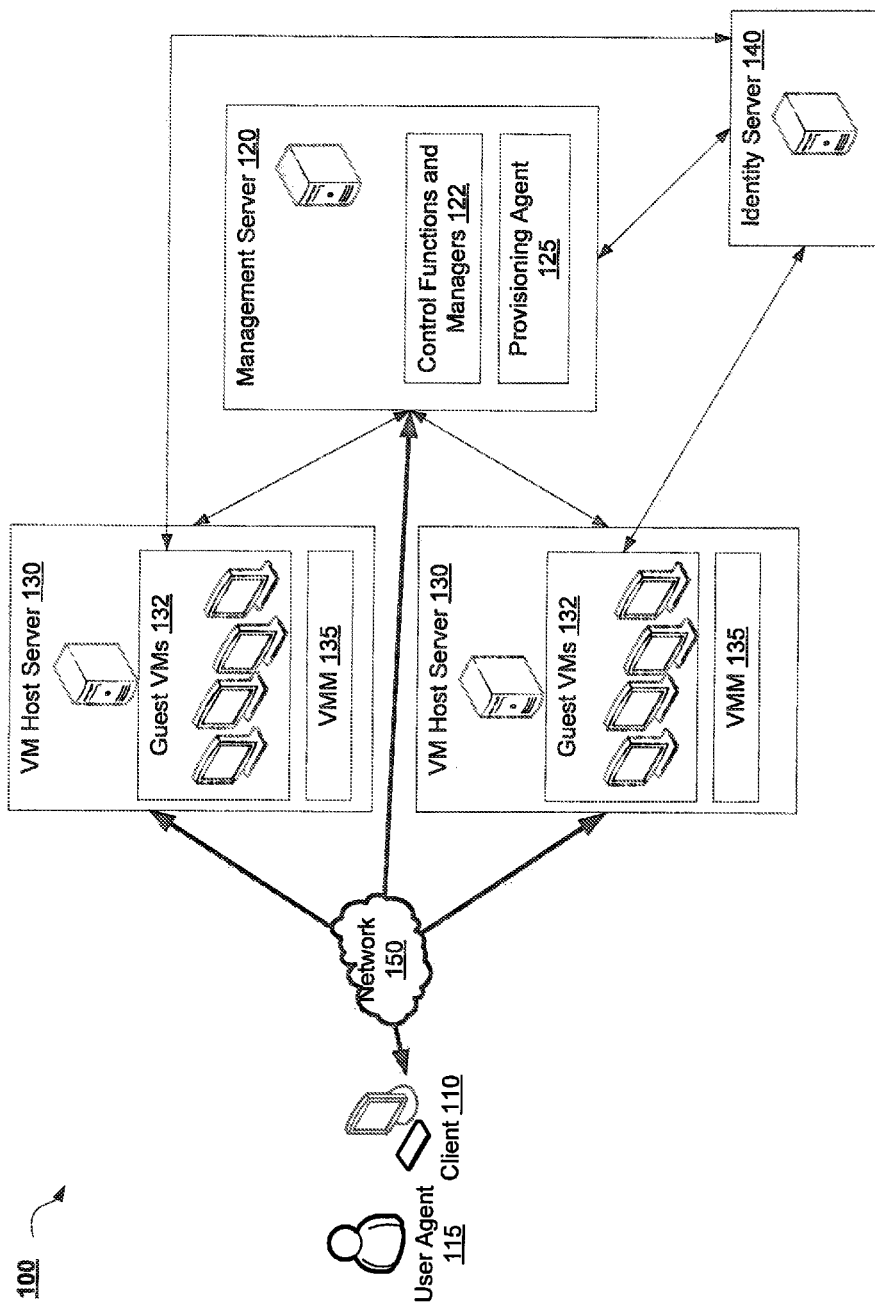
FIG. 1 is a block diagram of a virtual machine (VM) system for implementing a trusted environment for provisioning a virtual machine according to an embodiment of the invention.

Embodiments of the invention relate to providing a trusted environment for provisioning a virtual machine. In one embodiment, a method of providing a trusted environment for provisioning a virtual machine includes beginning an initialization process of a virtual machine (VM) hosted by a VM host server, obtaining by the VM as part of the initialization process a one-time password from the VM host server, the one-time password provided to the VM host server from a management server that created the one-time password, and authenticating the VM with an identity server using the one-time password.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention relate to providing a trusted environment for provisioning a virtual machine. In one embodiment, the trusted environment for provisioning a VM is established by bootstrapping an authentication between an administrator who is logged into a management server and an identity server to a new VM that is being initialized on a VM host server. The management server creates a one-time password associated with an identity record for the new VM on the identity server. This one-time password is passed through trusted and secure communication channels to the VM upon its initialization. The VM may then use this one-time password to authenticate with the identity server in a secure and automated manner.

FIG. 1 is a block diagram of a VM system 100 for implementing a trusted environment for provisioning a virtual machine according to embodiments of the invention. VM system 100 includes a client 110 used by a user agent (UA) 115 connected via network 150 to one or more VM host servers 130 that are managed by a management server 120. VM host servers 130 may be any type of a computing device having a memory, a processor, and so on. VM host servers 130 host VMs 132 that run on top of a software layer represented by a virtual machine monitor (VMM) 135 that runs on the hardware platform of VM host servers 130. VMM 135 virtualizes the VM host server's 130 physical resources for the VMs 132 hosted by VM host servers 130. VMM 135 may also be referred to as a hypervisor, a kernel-based hypervisor (e.g., Kernel-based VM (KVM)), or a host OS. VMs 132 provide virtual desktops for UA 115.

Management server 120 may be any type of a computing device having a memory, a processor, and so on. Management server 120 is coupled to the VM host servers 130. Management server 120 includes control functions and managers 122 for management of the VM system 100. For example, control functions and managers 122 may provide for high availability (HA) logic to handle VM host servers 130 and management server 120 failures, image management control to manage virtual desktop images, and session management/connection brokers to establish connections between the UA 115 and the associated VM 132. In addition, management server 120 includes a provisioning agent 125 to provision individual VMs 132 and pools of VMs 132.

VM system 100 also includes an identity server 140. Identity server 140 may be any type of a computing device having a memory, a processor, and so on. In one embodiment, identity server 140 is a functionally separate security server that serves a central repository for authentication and access control credentials. The identity server 140 provides identity and access management for users, such as UA 115, of the server. In some embodiments, the identity server 140 may be associated with a specific organization and/or individual groups within an organization. Identity server 140 may also act as a central audit database that audits security events, logs security events, and oversees compliance with security lockdowns.

In one embodiment, the identity server 140 may utilize a Kerberos authentication protocol. In another embodiment, the identity server 140 may utilize an OpenID protocol. One skilled in the art will appreciate that a variety of different authentication and security protocols are acceptable and possible to implement by identity server 140 and the other components of VM system 100.

Embodiments of the invention provide a trusted environment for provisioning a VM 132. The trusted environment for provisioning a VM 132 is established by bootstrapping an authentication between an administrator, such as UA 115, logged into the management server 120 and an identity server 140 to a new VM instance 132 being initialized on a VM host server 130. For example, in one embodiment, when a new VM 132 identity is to be created, an administrator 115 may log on to the management server 120 using their authentication credential. The administrator 115 is authenticated against the identity server 140 using the provided authentication credential. At this point, there is a trusted communication channel or session established between the management server 120 and the identity server 140 and the administrator 115 can now execute operations against the identity server 140. In particular, the administrator 115 can specify that a new VM needs to be provisioned.

The management server 120 may then generate a request to create a new identity record for a VM 132 that includes a one-time password to associate with the new identity record in the identity server 140. This request and one-time password are submitted to the identity server 140 via the trusted session of the administrator 115, who has permission to perform an add identity record operation against the identity server 140. In one embodiment, the provisioning agent 125 of management server 120 may generate the new identity record and one-time password.

Once the new identity record is created in the identity server 140, the management server 120 may push the one-time password, together with the identity record information, to a VM host server 130 via a secure channel. In one embodiment, this secure channel between the management server 120 and the VM host server 130 has been previously established upon initialization of the VM host server 130. The establishment of such a secure channel is known to one skilled in the art and beyond the scope of the present application.

When it is time for the VM 132 associated with the new identity record in the identity server 140 to be initialized, the VM 132 executes multiple operations to accomplish its initialization. One operation includes the VM 132 calling a command to pull the one-time password from the VM host server 130. The VM 132 may then connect and authenticate with the identity server 140 using the one-time password. The identity server 140 will see that this one-time password is associated with the identity record for the VM 132 already established in the identity server 140. As a result, the identity server 140 authenticates the VM 132 and issues a new long-term credential to the VM 132. In one embodiment, this long-term credential is a Kerberos key tab. However, one skilled in the art will appreciate that any type of long-term credential may be utilized in embodiments of the invention. The VM 132 may then utilize this long-term credential for any future communications and operations with the identity server 140.

Previous techniques for initial communication during provisioning between a VM 132 and an identity server 140 had required the VM 132 to either use a hard-coded password on an unsecure communications channel or have a manual intervention by an administrator 115 to manually register the VM 132 with the identity server 140. Such techniques were either prone to insecurities or burdensome. As described in embodiments of the invention, the one-time password is useful for automatically establishing a secure and trusted communication channel between a VM 132 and an identity server 140 upon the first initialization of the VM 132. Any future communications between the VM 132 and the identity server 140 then utilize the long-term credential provided to the VM 132 directly from the identity server 140.

In some embodiments, components of the VM system 100 described with respect to FIG. 1 may be functionally separate components residing on the same computing device. For instance, management server 120 may reside on the same server as VM host server 130 that hosts VMs 132. Although they may reside on the same computing device, the operations of each component are functionally separate from the other components on the device. One skilled in the art will appreciate that embodiments of the invention are not limited to the specific architectural layout depicted in FIG. 1 and different variations are envisioned.

Figure 2:
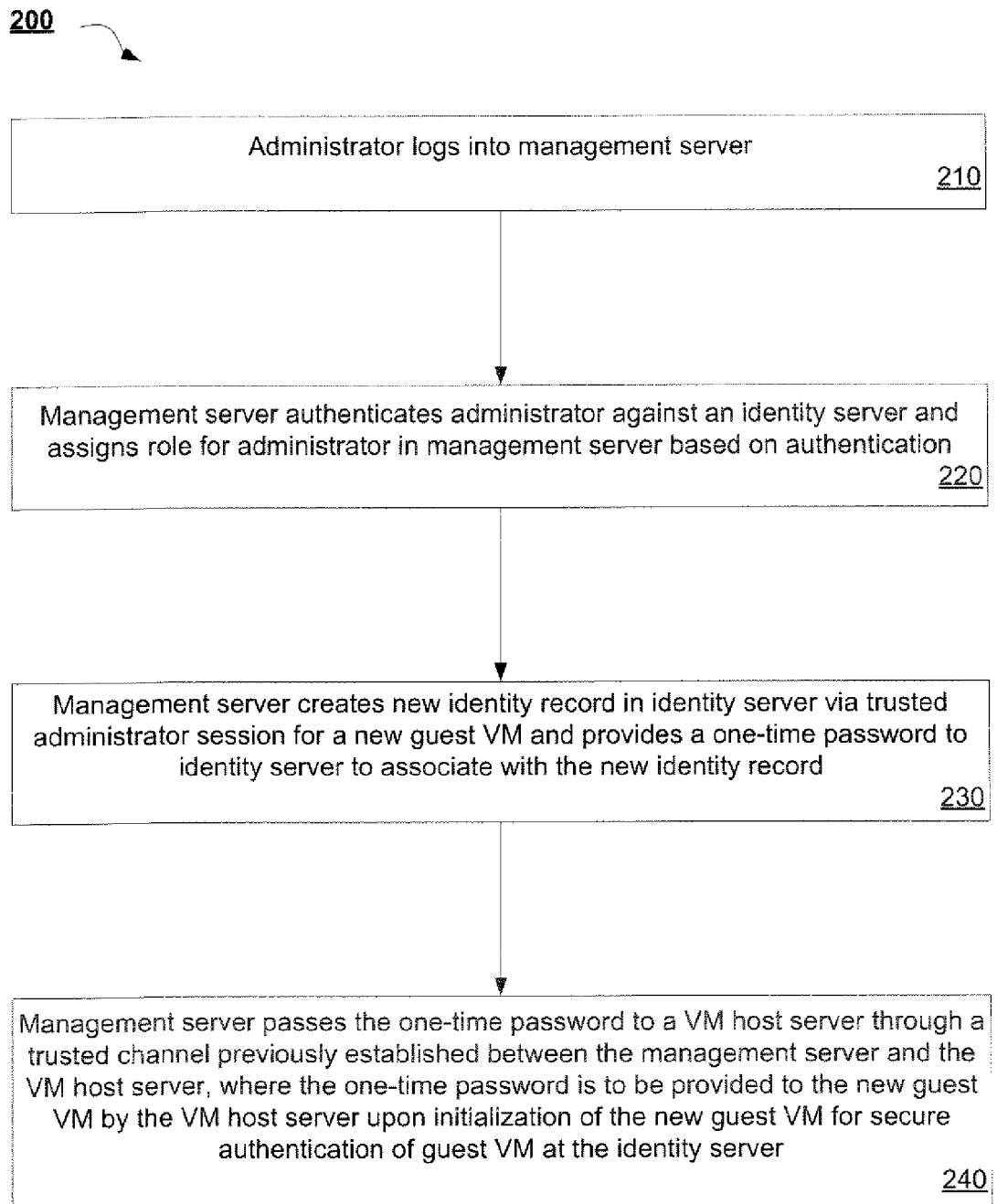
FIG. 2 is a flow diagram illustrating a method performed by a management server for providing a trusted environment for provisioning a VM according to an embodiment of the invention.

FIG. 2 is a flow diagram illustrating a method 200 performed by a management server for providing a trusted environment for provisioning a VM according to an embodiment of the invention. Method 200 may be performed by processing logic that may comprise hardware (e.g., circuitry, dedicated logic, programmable logic, microcode, etc.), software (such as instructions run on a processing device), or a combination thereof. In one embodiment, method 200 is performed by management server 120 and/or provisioning agent 125 of management server 120 described with respect to FIG. 1.

Method 200 begins at block 210 where an administrator logs into a management server of a VM system by providing authentication credentials. Then, at block 220, the management server authenticates the credentials of the administrator against an identity server. Once authenticated, the management server assigns a role in the management server for the administrator based on the authentication.

At block 230, the management server creates a new identity record in the identity server via the established trusted administrator session. This new identity record is a place holder in the identity server for a new VM once this VM is initialized on a VM host server. In one embodiment, this new identity record is requested by the management server via a declaration to the identity server. As part of the new host identity record request, a one-time password is created by the management server and provided to the identity server to associate with the new host identity record.

Subsequently, at block 240, the management server passes the one-time password to a VM host server through a trusted channel already established between the two components. The one-time password will then be available to the new VM upon its initialization. The VM may utilize the one-time password for authentication at the identity server in a secure and automated manner.

Figure 3:
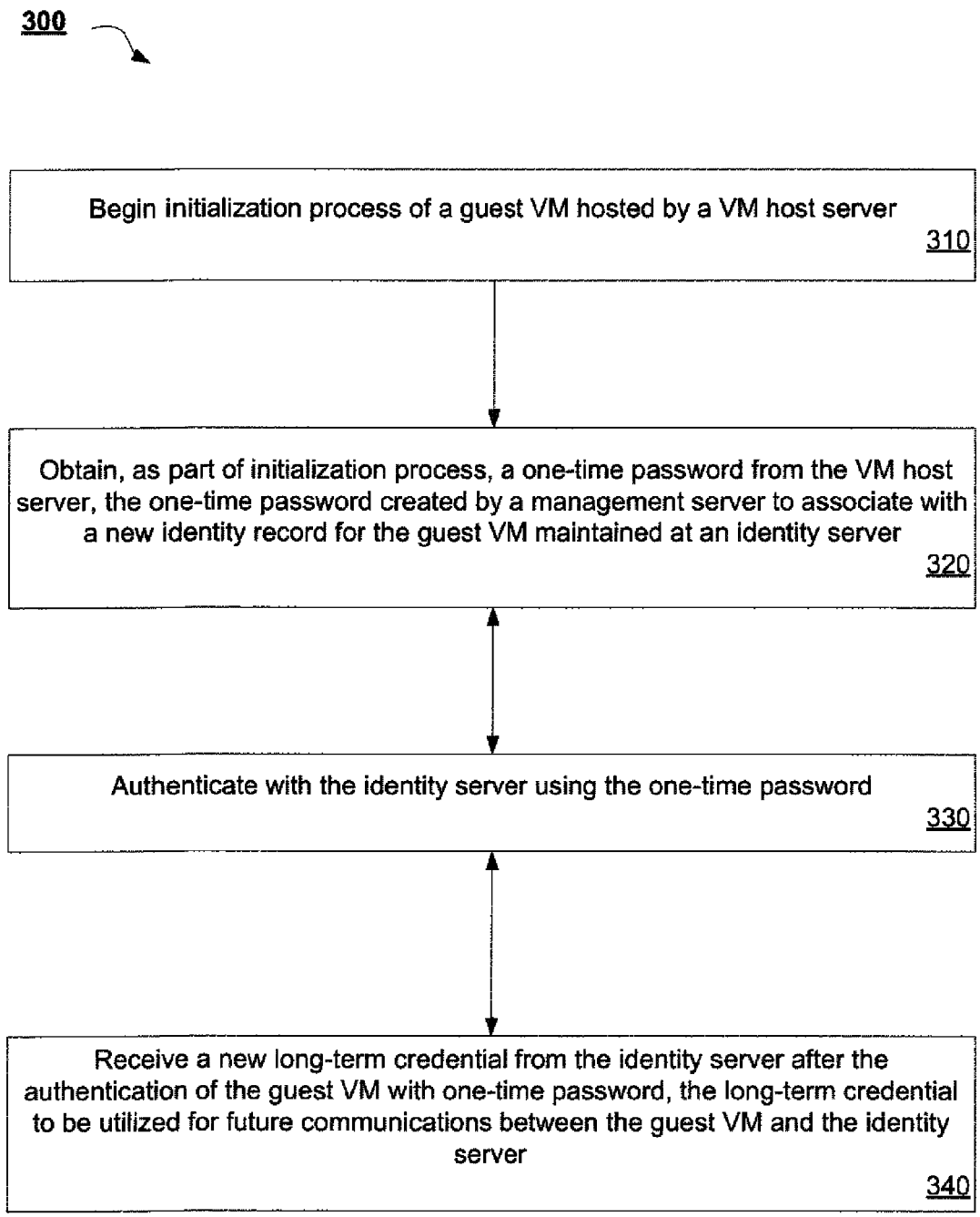
FIG. 3 is a flow diagram illustrating a method performed by a VM as part of provisioning the VM in a trusted environment according to an embodiment of the invention.

FIG. 3 is a flow diagram illustrating a method 300 performed by a VM as part of provisioning the VM in a trusted environment according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by VM 132 as described with respect to FIG. 1.

Method 300 begins at block 310 where a VM in a VM system begins an initialization process. In one embodiment, this VM is hosted by a VM host server in the VM system. At block 320, as part of the initialization process, a one-time password is obtained by the VM from the VM host server. In one embodiment, the one-time password was initially created by a management server that oversees the VM host server. The management server provided the one-time password to an identity server to associate with a new identity record for the VM maintained by the identity server. In addition to creating the one-time password, the management server also requested the new identity record for the VM at the identity server.

Then, at block 330, the VM uses the one-time password to authenticate and enroll with the identity server. This authentication process is also part of the initialization process of the VM. Subsequently, at block 340, a new long-term credential is received at the VM from the identity server over the trusted channel established between the two components as a result of the one-time password. The long-term credential may be utilized for all future communications between the VM and the identity server. In one embodiment, the long-term credential is a Kerberos key tab. However, one skilled in the art will appreciate that other authentication and security protocols may be utilized for the credentials used with respect to method 300. As a result of method 300, a VM may now be initialized and authenticated at an identity server via a secure and automated mechanism.

Figure 4:
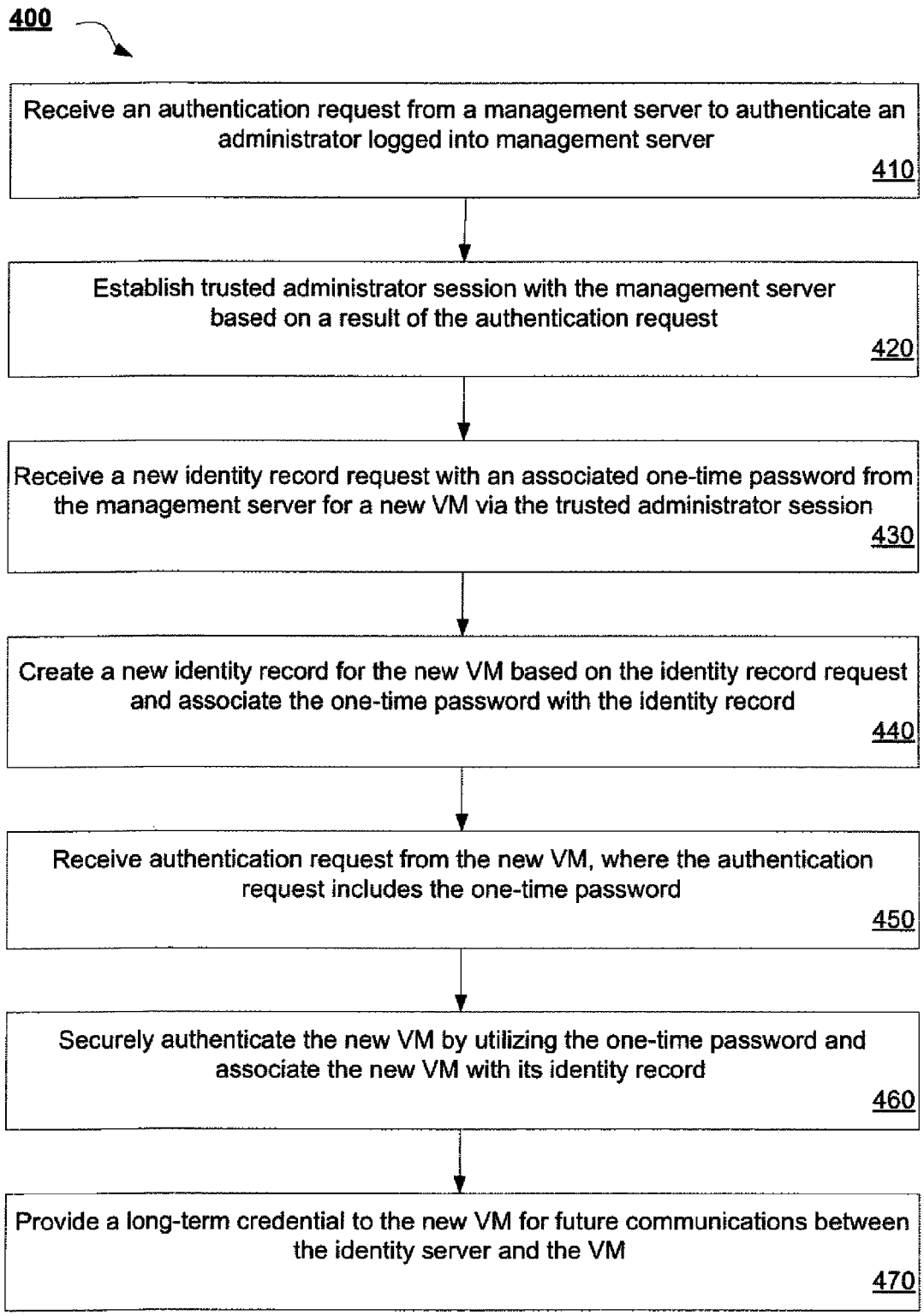
FIG. 4 is a flow diagram illustrating a method performed by an identity server for providing a trusted environment for provisioning a VM according to an embodiment of the invention.

FIG. 4 is a flow diagram illustrating a method 400 performed by an identity server for providing a trusted environment for provisioning a VM according to an embodiment of the invention. Method 400 may be performed by processing logic that may comprise hardware (e.g., circuitry, dedicated logic, programmable logic, microcode, etc.), software (such as instructions run on a processing device), or a combination thereof. In one embodiment, method 400 is performed by identity server 140 described with respect to FIG. 1.

Method 400 begins at block 410 where an authentication request is received from a management server to authenticate an administrator logged into the management server. Then, at block 420, a trusted administrator session is established with the management server based on a result of the authentication request. At block 430, a new identity record request is received from the management server. This new identity record request is for a new VM to be provisioned by a VM host server managed by the management server. With the new identity record request is a one-time password to associate with the new identity record.

Subsequently, at block 440, the identity server creates a new identity record for the new VM based on the identity record request. The one-time password is associated with this new identity record. At block 450, an authentication request is received from the new VM upon its provisioning by the VM host server. This authentication request from the new VM includes the one-time password. As previously described, this one-time password was provided from the management server to the VM host server. The new VM then pulled the one-time password from the VM host server as part of its initialization process for authentication with the identity server.

At block 460, the identity server securely authenticates the new VM by utilizing the one-time password provided by the new VM and associates the new VM with its established identity record in the identity server. Finally, at block 470, the identity server provides a long-term credential to the new VM after authentication of the VM. The long-term credential is used for any future communications between the new VM and the identity server. In one embodiment, the long-term credential may be a Kerberos key tab.

Figure 5:
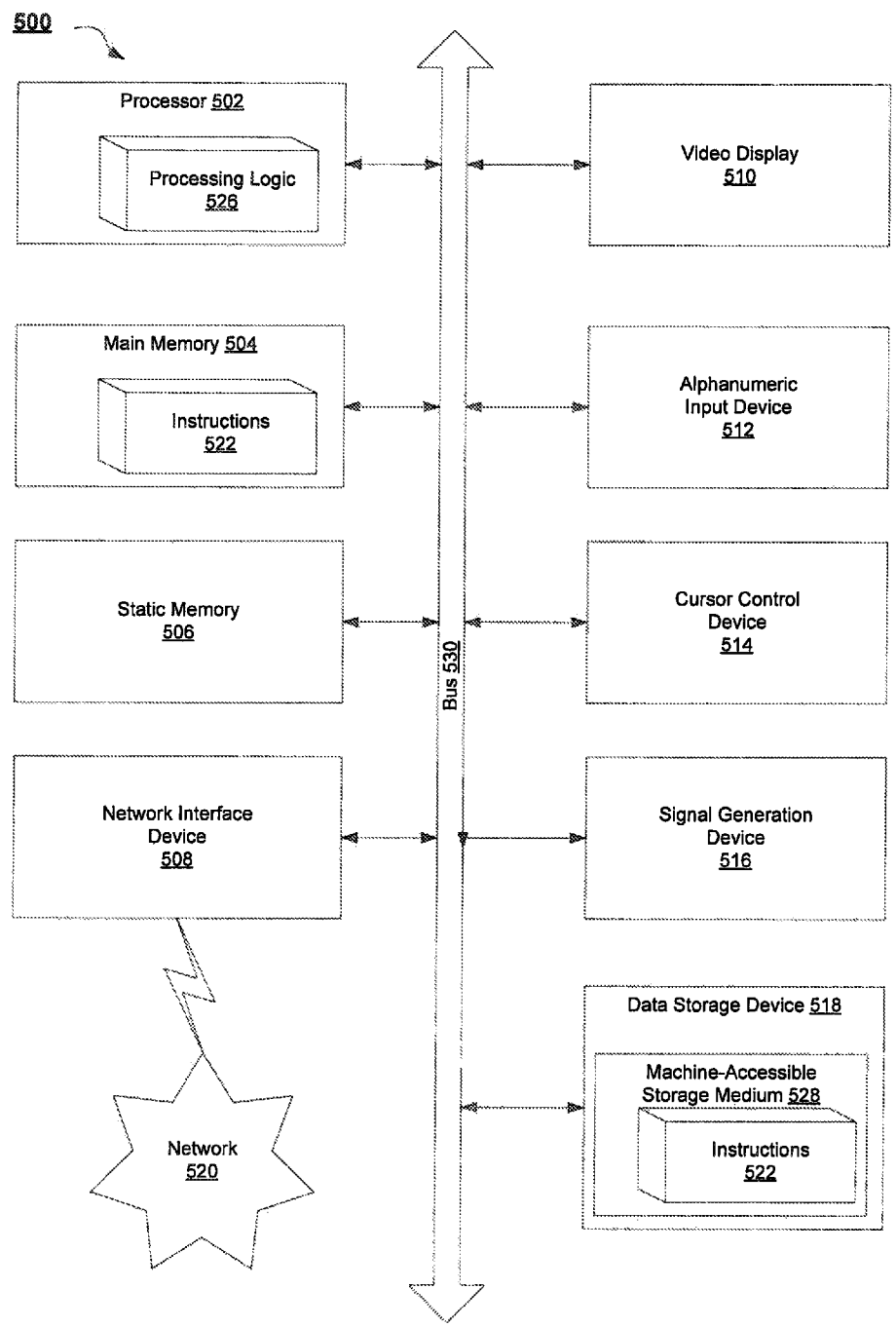
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an internet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be a complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-accessible storage medium 528 may also be used to store instructions to perform methods 200 and 300 to provide a trusted environment for provisioning a VM as described with respect to FIGS. 2 and 3, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:

executing, by a virtual machine (VM) hosted by a VM host server device, an initialization process of the VM, wherein the VM virtualizes a processing device and a memory of the VM host server device;

pulling, by the VM as part of the initialization process, a one-time password directly from the VM host server device, the one-time password corresponding to an identity record of the VM on an identity server and provided to the VM host server device from a management server that created the one-time password, wherein the management server authenticates an administrator, that is logged into the management server and requests the initialization process of the VM, against the identity server and causes the one-time password to be generated as part of the identity record of the VM and to be pushed to the VM host server device using a secure channel previously established upon initialization of the VM host server device; and providing, by the VM, the one-time password directly to the identity server in order for the identity server to authenticate the VM.

2. The method of claim 1, further comprising receiving a long-term credential from the identity server after the authentication of the VM with the identity server using the one-time password.

3. The method of claim 2, further comprising utilizing, by the VM, the long-term credential for any future communications with the identity server.

4. The method of claim 2, wherein the long-term credential is a Kerberos keytab.

5. The method of claim 1, wherein the management server requests the identity record for the VM at the identity server prior to the initialization process.

6. The method of claim 5, wherein the management server provides the one-time password to the identity server in order for the identity server to associate the one-time password with the identity record for the VM.

7. The method of claim 5, wherein the management server authenticates against the identity server prior to requesting the identity record by providing an authentication credential for the administrator utilizing the management server.

8. The method of claim 1, wherein the identity server uses a Kerberos authentication protocol.

9. A system, comprising:
a memory;
a processing device communicably coupled to the memory; and
a management server executable from the memory by the processing device, the management server communicably coupled to a virtual machine (VM) host server to control functions of the VM host server, the management server to:
authenticate an administrator logged into the management server against an identity server that is communicably coupled to the management server in order to create a trusted administrator session with the identity server, wherein the administrator requests an initialization process of a new VM of one or more VMs to be hosted by the VM host server;
request a new identity record in the identity server via the trusted administrator session, the new identity record for the new VM;
provide a one-time password to the identity server in order for the identity server to associate the one-time password with the new identity record; and
pass, via a secure channel previously established with the VM host server upon initialization of the VM host server, the one-time password to the VM host server in order for the VM host server to provide the one-time password to the new VM to use for authentication with the identity server, wherein the new VM provides the one-time password directly to the identity server in order for the identity server to authenticate the new VM.

10. The system of claim 9, wherein the one-time password is pulled by the new VM from the VM host server upon initialization of the new VM, the one-time password utilized for secure authentication of the new VM at the identity server.

11. The system of claim 10, wherein the identity server provides a long-term credential to the new VM after the authentication of the new VM with the identity server using the one-time password.

12. The system of claim 11, wherein the new VM utilizes the long-term credential for any future communications with the identity server.

13. The system of claim 12, wherein the long-term credential is a Kerberos keytab.

14. The system of claim 9, wherein the administrator logs into the management server with an authentication credential that is used to authenticate against the identity server.

15. The system of claim 9, wherein the identity server uses a Kerberos authentication protocol.

16. A non-transitory machine-readable storage medium including instructions that, when accessed by a processing device, cause the processing device to perform operations comprising:
establishing, by the processing device of an identity server, a trusted administrator session with a management server based on a result of an authentication request sent by the management server to the identity server;
receiving, by the identity server, a new identity record request comprising a one-time password from the management server via the trusted administrator session, the new identity record corresponding to a new virtual machine (VM) to be provisioned by a VM host server, wherein the management server authenticates an administrator, that is logged into the management server and requests an initialization process of the new VM, against the identity server, and wherein the one-time password is pushed to the VM host server from the management server using a secure channel previously established between the management server and the VM host server upon initialization of the VM host server;
creating, by the identity server, the new identity record for the new VM based on the new identity record request, where the one-time password is associated with the new identity record;
receiving, by the identity server, an authentication request comprising the one-time password from the new VM upon provisioning of the new VM by the VM host server, wherein the new VM provides the one-time password directly to the identity server as part of the authentication request; and
securely authenticating, by the identity server, the new VM by utilizing the one-time password provided by the new VM.

17. The non-transitory machine readable storage medium of claim 16, wherein the one-time password is to be provided to the new VM by the VM host server upon initialization of the new VM.

18. The non-transitory machine readable storage medium of claim 17, wherein the operations further comprise providing, by the identity server, a long-term credential to the new VM after the secure authentication of the new VM.

19. The non-transitory machine readable storage medium of claim 18, wherein the new VM utilizes the long-term credential for any future communications with the identity server.

20. The non-transitory machine readable storage medium of claim 16, wherein the identity server uses a Kerberos authentication protocol.

* * * * *